United States Patent [19]

Ive

[11] Patent Number: 4,723,176

[45] Date of Patent: Feb. 2, 1988

[54] VIDEO TAPE RECORDERS

[75] Inventor: John G. S. Ive, Basingstoke, United Kingdom

[73] Assignee: Sony Corporation, Tokyo, Japan

[21] Appl. No.: 791,153

[22] Filed: Oct. 24, 1985

[30] Foreign Application Priority Data

Nov. 28, 1984 [GB] United Kingdom ............... 8430032

[51] Int. Cl.⁴ ............... G11B 27/02; G11B 27/36; H04N 5/782
[52] U.S. Cl. ............... 360/19.1; 360/31; 360/14.1; 360/13; 360/2; 358/343
[58] Field of Search ............... 360/31, 14.1, 19.1, 360/32, 84, 7, 9.1, 13; 369/3, 2; 358/343; 369/83

[56] References Cited

U.S. PATENT DOCUMENTS

| | | | |
|---|---|---|---|
| 4,318,146 | 3/1982 | Ike | 360/84 |
| 4,389,680 | 6/1983 | Gramling | 360/84 |
| 4,517,609 | 5/1985 | Yoshihiko | 360/19.1 |
| 4,517,615 | 5/1985 | Hino | 360/84 |
| 4,563,710 | 1/1986 | Baldwin | 360/19.1 |

Primary Examiner—Alan Faber
Attorney, Agent, or Firm—Lewis H. Eslinger; Alvin Sinderbrand

[57] ABSTRACT

A digital video tape recorder comprises a rotary transducer head arrangement comprising an advance read head and a confidence head both capable of reading audio signals recorded in portions of oblique tracks on a magnetic tape, the heads being positioned relative to one another such that an audio signal at any given position on the magnetic tape reaches the advance read head a predetermined time before the same signal reaches the confidence head, and a delay device for delaying the output of the advance read head by that predetermined time.

8 Claims, 8 Drawing Figures

VIDEO TAPE RECORDERS

BACKGROUND OF THE INVENTION

1. Field of the Invention

This invention relates to video tape recorders (VTRs). More particularly, but not exclusively, the invention relates to rotary transducer head arrangements in a digital VTR.

2. Description of the Prior Art

Whereas in an analog VTR audio signals are generally recorded in longitudinally extending tracks, it is generally proposed that in digital VTRs the audio signals should be recorded in the oblique tracks in which the video signal is recorded. While this arrangement presents no serious difficulties in recording or in normally reproducing audio signals, there are some problems in editing the audio signals.

Thus the facilities required in audio editing are generally as follows:

(1) Each audio channel should be capable of being independently edited.

(2) Confidence playback of all recorded material including editing transitions should be possible.

(3) It should be possible to do cross-fade edits in a similar manner to analog VTRs, that is to say over a period of some 30 to 40 milliseconds. Preferably the cross-fade rates and periods should be variable.

(4) It should be possible to do track to track dubbing without lipsync problems.

(5) Confidence playback should be availabe when insert editing.

(6) Confidence playback should be available when assemble editing.

There are also, however, some mechanical and electrical constraints that need to be considered. For example, it is preferable that the number of head assemblies on the rotary head drum and the number of associated rotary transformers should not be too large, and it is preferable that the head assemblies be positioned to minimize cross-talk.

SUMMARY OF THE INVENTION

One object of the present invention is to provide a digital video tape recorder providing at least some of the above facilities for audio editing.

Another object of the present invention is to provide a digital video tape recorder comprising an advance read head and a confidence read head, and a delay device to which the output of the advance read head can be supplied.

According to the present invention there is provided a digital video tape recorder comprising:

a rotary transducer head arrangement comprising an advance read head and a confidence head each capable of reading audio signals recorded in portions of oblique tracks on a magnetic tape, said advance read head and said confidence head being positioned relative to one another such that an audio signal recorded at a given position on said tape reaches said advance read head at a predetermined time before said audio signal reaches said confidence head; and a delay device to which the output of said advance read head can be supplied and which delays said output by said predetermined time.

The above, and other objects, features and advantages of this invention will be apparent from the following detailed description of illustrative embodiments which is to be read in connection with the accompanying drawings.

DESCRIPTION OF THE PREFERRED EMBODIMENTS

Figure 1:
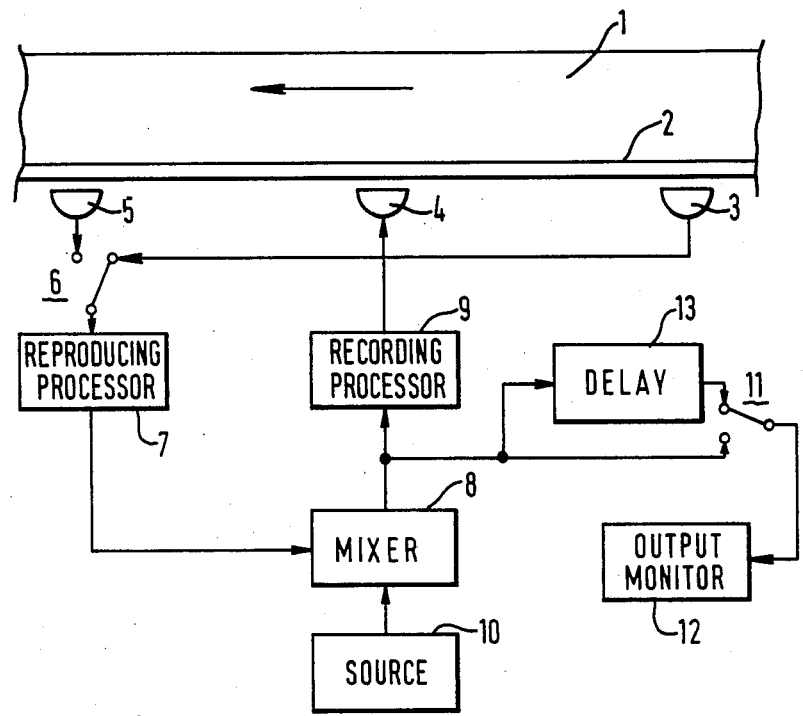
FIG. 1 shows diagrammatically a linear equivalent of a rotary transducer head arrangement.

Some of the general principles underlying the rotary transducer head arrangement to be described below will first be explained with reference to FIG. 1, because the operation can more readily be understood when it is shown in the equivalent linear form. In the arrangement of FIG. 1, therefore, a magnetic tape 1 is assumed to be moving linearly in the direction of the arrow, and a single longitudinally-extending audio track 2 is shown. Associated with the audio track 2 are, in the order corresponding to the direction of movement of the tape 1, an advance read head 3, a recording head 4 and a confidence head 5. The output of the advance read head 3 can be supplied by way of one input terminal of the switch 6 to a reproducing processor 7, and the output of the confidence head 5 can be supplied by way of the other input terminal of the switch 6 to the reproducing processor 7, the output of which is connected to one input of a mixer 8. The output of the mixer 8 is connected to a recording processor 9, the output of which is connected to the recording head 4. The mixer 8 has a second input to which an externally supplied signal is applied from a source 10 during editing. The output of the mixer 8 is also connected to one input terminal of a switch 11, the output terminal of which is connected to an output monitor 12. The output of the mixer 8 is also connected to the other input terminal of the switch 11 by way of a delay device 13. The delay device 13 provides a delay corresponding to the delay between reproduction of a signal by the advance read head 3 and reproduction of the same signal by the confidence head 5 at the normal reproduction speed.

Consideration of this arrangement and of the six requirements set out above, will show that all the requirements can be satisfied with just two restrictions. Firstly, if an audio signal is to be reproduced from the track 2, mixed with another signal supplied from the source 10 and re-recorded in the track 2 continuously for a period longer than the delay of the delay device 13, then confidence playback is lost. Secondly, and for the same reason, the cross-fade period with full confidence playback is limited to a maximum equal to the delay of the delay device 13.

During an edit, two stages of monitoring are generally required. Firstly, monitoring before the edit for continuity, and secondly, confidence monitoring during the edit and following on to subsequently recorded material. Because the delay device 13 can pass the pre-edit audio with a delay, an uninterrupted switch can be made to confidence playback once the edit has been recorded and reached the confidence head 5. Thereupon the switch 6 is switched so that the signal from the confidence head 5, instead of the signal from the advance read head 3, is supplied to the reproduction processor 7 and thence to the output monitor 12, the switch 11 being switched at the same time so that the delay of the delay device 13 is eliminated.

The cross-fade period is limited to the duration of the delay of the delay device 13, that is to say the delay between the advance read and confidence playback, unless separate re-play processors 7 are provided for the advance read head 3 and the confidence head 5, respectively. However, this is not preferred, partly because it increases the hardware requirements, but also because when it comes to the rotary arrangement to be described below, it is likely to increase the number of rotary transformers required with consequent space difficulties and increased risk of cross-talk in the rotary head drum. In the case of a 50 fields per second television system, each frame occupies a period of 40 milliseconds, which is a convenient period for a cross-fade edit. It will be assumed that in a digital VTR each field occupies twelve oblique tracks, and what this means, therefore, in translating the linear arrangement of FIG. 1 into a rotary arrangement, is that the confidence head 5 needs to be offset by 24 oblique tracks relative to the advance read head 3. (For a 60 fields per second television system each field may occupy ten oblique tracks and the offset would need to be twenty oblique tracks).

Before considering the physical structure of the rotary transducer head arrangement, it is necessary to consider in somewhat more detail the format in which signals are recorded on a magnetic tape in a digital VTR.

Figure 2:
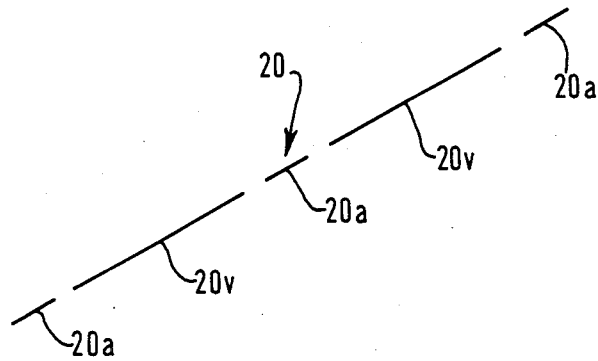
FIG. 2 shows diagrammatically an oblique track on a magnetic tape.

FIG. 2 shows diagrammatically a single oblique track 20 recorded on a magnetic tape by a digital VTR. As mentioned above, it is usual in a digital VTR for the audio signals to be recorded in the oblique tracks 20 together with the video signal. For this purpose, certain portions 20a of each oblique track 20 are allocated to the audio signals. The audio portions 20a are generally at the beginning and/or end or in the centre of each oblique track 20, as indicated in FIG. 2. In standardization circles the centre position is coming to be favoured, and in the description which follows, therefore, it will be assumed that the audio signals are recorded in the centre of each oblique track 20, although this is not essential to the invention.

Figure 3:
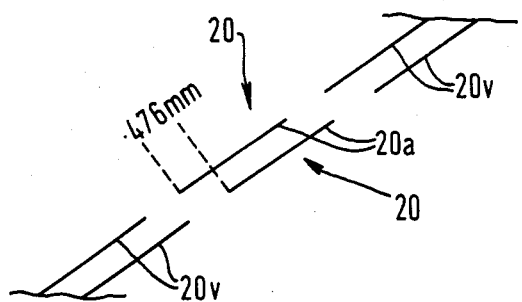
FIG. 3 shows diagrammatically parts of two oblique tracks on a magnetic tape.

FIG. 3 shows diagrammatically the central regions of two adjacent oblique tracks 20, in particular the respective audio portions 20a, and the immediately adjacent parts of the respective video portions 20v. Although such oblique tracks 20 are generally drawn at quite a steep angle when illustrated diagrammatically, it is important in understanding the present invention to remember that in fact the oblique tracks 20 are at a small angle to the length of the magnetic tape. Thus in a typical configuration each oblique track 20 may be 170 mm long when the tape width is 19 mm, of which only approximately 16 mm is occupied by the oblique tracks 20. Thus in this case each oblique track 20 is at an angle of approximately 5.4 degrees to the length of the magnetic tape.

As seen in FIG. 3, what this means is that the start of each oblique track 20, and more particularly the start of each audio portion 20a in successive oblique tracks 20 is offset by approximately 0.476 mm relative to the corresponding point in the next track, in the direction parallel to the length of the oblique tracks 20.

Figure 4:
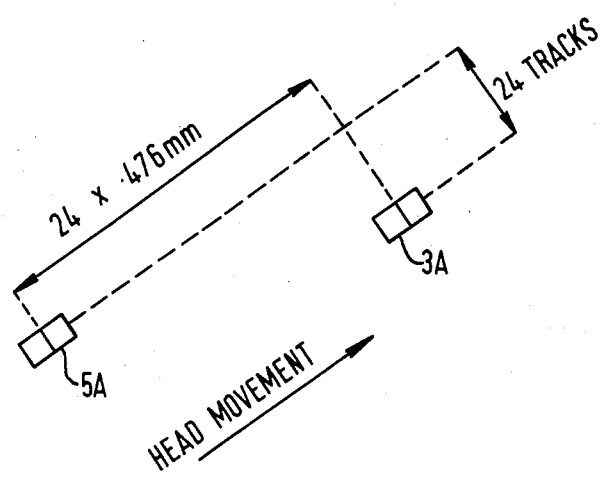
FIG. 4 shows diagrammatically offset distances between two transducer heads.

Having in mind then the requirement for a 24 track offset; the principles described with reference to FIG. 1; and the track offset shown in FIG. 3, then in a rotary transducer head arrangement a head assembly comprising an advance read head 3A and a confidence head 5A will, as shown in FIG. 4, need to have the heads 3A and 5A offset perpendicular to the direction of head movement by a distance corresponding to 24 track pitches, and offset in the direction parallel to the head movement by a distance equal to 24×0.476 mm, that is approximately 11.4 mm. In a typical case, the track pitch is 45 microns, so the offset perpendicular to the direction of head movement is approximately 1.08 mm.

The suffixes "A" have been applied to the heads 3A and 5A in FIG. 4, because a digital VTR in which each field is to occupy 12 oblique tracks will generally be a so-called 4-head machine, and the signal for recording is demultiplexed into four channels designated A, B, C and D and supplied to respective recording heads in each of two head pair assemblies comprising A and B channel heads and C and D channel heads respectively. The advance read and confidence heads are likewise duplicated for each channel.

Figure 5:
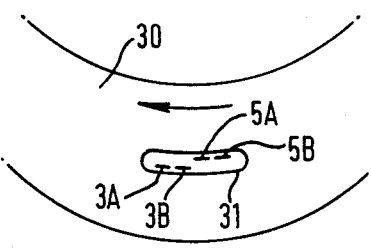
FIG. 5 shows diagrammatically part of the peripheral surface of a rotary head drum.

FIG. 5 shows very diagrammatically part of the outer peripheral surface of the rotary head drum 30 of such a digital VTR and shows a head assembly window 31. Indicated in the window 31 is a head assembly comprising advance read heads 3A and 3B and confidence heads 5A and 5B. The advance read head 3A is offset relative to the confidence head 5A, and the advance head 3B is offset relative to the confidence 5B by the distances described with reference to FIG. 4. To enable these distances to be accurately adjusted, the head assembly may comprise two blocks carrying the heads 3A and 3B, and 5A and 5B, respectively.

Figure 6:
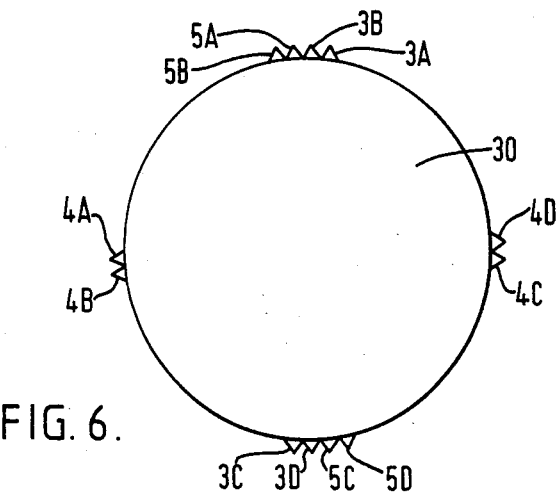
FIG. 6 shows a diagrammatic plan view of the rotary head drum.

FIG. 6 is a diagrammatic plan view of the rotary head drum 30, which in addition to indicating the two head assemblies comprising the advance read and confidence heads for the channels A to D, also indicates the two head assemblies comprising the recording heads for the four channels A to D.

Figure 7:
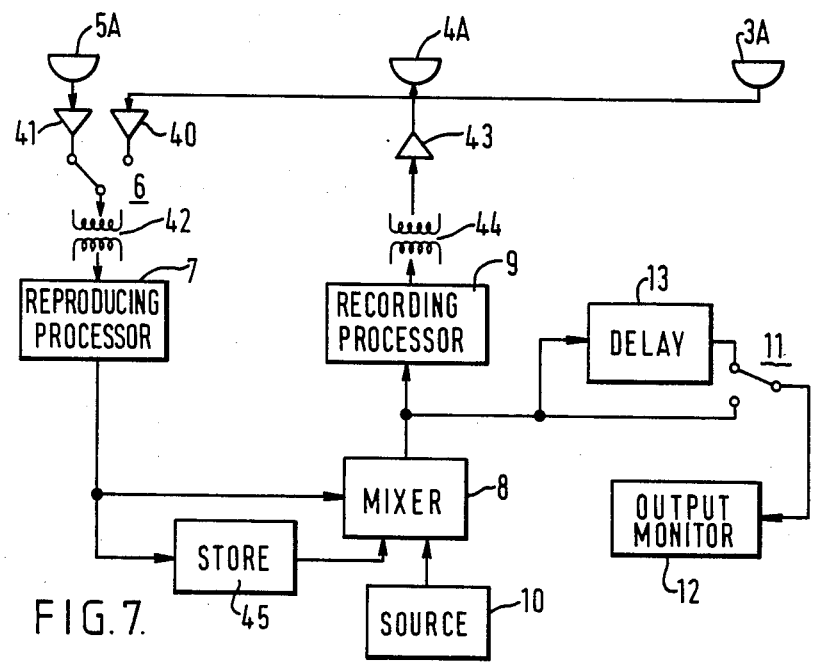
FIG. 7 shows part of the circuit arrangement of a rotary transducer head arrangement which is to form part of an embodiment of digital VTR according to the invention.

Reference will now be made to FIG. 7 which shows that part of a rotary transducer head arrangement for an embodiment of the present invention corresponding to the linear equivalent shown in FIG. 1. Where possible, the same reference numerals are used for like integers, and for simplicity the heads for only a single channel are shown. It will be usual for the head assembly comprising the advance read head 3A and the confidence 5A to incorporate a pre-amplifier 40 for amplifying the signal derived from the advance read head 3A and a pre-amplifier 41 for amplifying the signal derived from the confidence head 5A. This head assembly also comprises an electronic switch forming the switch 6, the output of the switch 6 being coupled by way of a rotary transformer 42 to the reproducing processor 7. Alternatively, a single preamplifier can be associated with the heads 3A and 5A by positioning it on the other side of the switch 6. Likewise, the head assembly comprising the recording head 4A will include a recording amplifier 43 for amplifying signals being supplied to the recording head 4A, and signals for recording supplied by the recording processor 9 will be supplied by way of a rotary transformer 44 to the recording amplifier 43. This arrangement minimises the number of rotary transformers required in the digital VTR and also reduces the possibility of cross-talk. A store 45 referred to below may also be provided. Apart from the points mentioned, the circuit arrangement is the same as shown and described with reference to FIG. 1, and in particular the delay of the delay device 13 corresponds to the delay between reproduction of a signal by the advance read head 3A and reproduction of the same signal by the confidence head 5A at the normal reproduction speed.

The operation of the rotary transducer head arrangement, and in particular the operation during editing is generally as described above with reference to the equivalent linear form. Only one particular operation will be considered in more detail in the present description, and that is the operation during an insert edit with cross-fade in and out. This will be described with reference to the time chart of FIG. 8.

Figure 8:
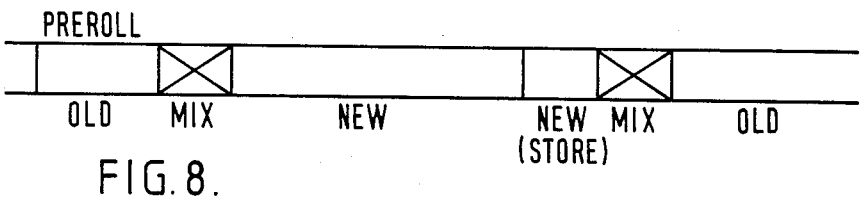
FIG. 8 shows a time chart used in describing the operation of the digital VTR.

Basically, FIG. 8 indicates the head from which the audio signal which is being reproduced at any given time is derived. During an initial period preceding the cross-fade in, old audio will be derived from the advance read head 3A. Then, during the cross-fade in, while old audio is being mixed with new audio, the reproduced audio will be derived from the confidence head 5, and this will continue subsequent to the end of the cross-fade in. That is to say, the reproduced audio will continue to be derived from the confidence head 5 for a period subsequent to the cross-fade in, to provide an assurance that the new audio is being correctly recorded. When that assurance has been given, and some 20 to 40 microseconds before the beginning of the cross-fade out, reproduction will switch from the confidence head 5 to the advance read head 3, and the output of the advance read head 3 will be stored electronically, for example in the store 45 connected between the reproducing processor 7 and the mixer 8. Then, at the beginning of the cross-fade out, that part of the audio signal reproduced by the advance read head 3 and stored will be supplied to the mixer 8 in place of the audio signal from the source 10, to be mixed with the old audio during the cross-fade out. Subsequent to the cross-fade out, the reproduced audio will be derived from the confidence head 5, at least for a sufficient period to provide assurance that the return to the old audio has been correctly achieved.

During normal operation the video signal will be derived from the confidence head 5, and any necessary switching to a different head required for reproduction of the audio signal is triggered by the edit gap provided between each video portion 20v and a following audio portion 20a.

Various modifications are of course possible without departing from the invention as defined by the appended claims. In particular, the invention is not restricted to a so-called 4-head machine, and the various numbers of tracks and distances quoted above are given purely by way of example.

I claim:

1. A digital video tape recorder comprising:
   a rotary transducer head arrangement including an advance read head and a confidence read head each capable of reading audio signals recorded in portions of oblique tracks on a magnetic tape and producing respective outputs, said advance read head and said confidence read head being positioned relative to one another such that an audio signal recorded at a given position on said tape reaches said advance read head for reproduction thereby at a predetermined time before said audio signal reaches said confidence read head for reproduction thereby;
   monitor means for monitoring a received output;
   switch means for supplying a selected one of the outputs of said advance read head and said confidence read head to said monitor means; and
   delay means to which the output of said advance read head is supplied for delaying said output of said advance read head by said predetermined time prior to its supply to said monitor means to provide a confidence playback without loss of continuity.

2. A digital video tape recorder according to claim 1 wherein said predetermined time corresponds to the maximum required duration of a cross-fade between audio signals.

3. A digital video tape recorder according to claim 2 wherein said predetermined time is 30 to 40 milliseconds.

4. A digital video tape recorder according to claim 1 wherein said predetermined time corresponds to the duration of n said oblique tracks, said advance read head and said confidence read head are offset from one another in the direction perpendicular to said oblique tracks by a distance equal to n times the pitch of said oblique tracks, and said advance read head and said confidence read head are offset from one other in the direction parallel to said oblique tracks by a distance equal to n times the offset between corresponding points in adjacent ones of said oblique tracks.

5. A digital video tape recorder according to claim 4 for a 60 fields per second television system, wherein each said field occupies ten said oblique tracks and n is equal to twenty.

6. A digital video tape recorder according to claim 1 wherein said advance read head and said confidence read head are mounted on a single head assembly and said head assembly further includes a switch for selectively deriving the output of said advance read head or said confidence read head, and at least one preamplifier means for amplifying a reproduced signal.

7. A digital video tape recorder according to claim 6 comprising a single reproduction processor to which an output of said head assembly is supplied by way of a rotary transformer.

8. A digital video tape recorder according to claim 7 wherein said rotary transducer head arrangement further includes a recording head, and further comprising a recording processor for supplying a signal to said recording head by way of a rotary transformer, and a mixer to which the output of said reproduction processor is supplied and which supplies output to said recording processor and to said delay means.

* * * * *